United States Patent [19]

McGoff et al.

[11] Patent Number: 5,038,768

[45] Date of Patent: Aug. 13, 1991

[54] CARBON MONOXIDE CONVERSION DEVICE

[75] Inventors: Miles J. McGoff, Wexford; Sheridan J. Rodgers, Ellwood City, both of Pa.

[73] Assignee: The United States of America as represented by the Secretary of the Navy, Washington, D.C.

[21] Appl. No.: 415,519

[22] Filed: Oct. 2, 1989

[51] Int. Cl.[5] .............................................. A61M 15/00
[52] U.S. Cl. .......................... 128/202.26; 128/205.12; 128/205.28
[58] Field of Search ...................... 128/202.26, 205.12, 128/205.28; 55/DIG. 33, DIG. 35

[56] References Cited

U.S. PATENT DOCUMENTS 4,807,614 2/1989 vander Smissen et al. .... 128/201.25

OTHER PUBLICATIONS

"The Universal and the Fireman's Gas Masks", by Katz et al. 5/23/23, Technical Paper 300, Dept of the Interior.

Primary Examiner—Aaron J. Lewis
Attorney, Agent, or Firm—Robert W. Adams

[57] ABSTRACT

Means for removing contaminants from an air stream are disclosed that at the same time provides a cost effective apparatus for training firefighters. HOPCALITE is used to remove carbon monoxide while other compositions remove particulates, water and organic vapors, and carbon dioxide.

11 Claims, 1 Drawing Sheet

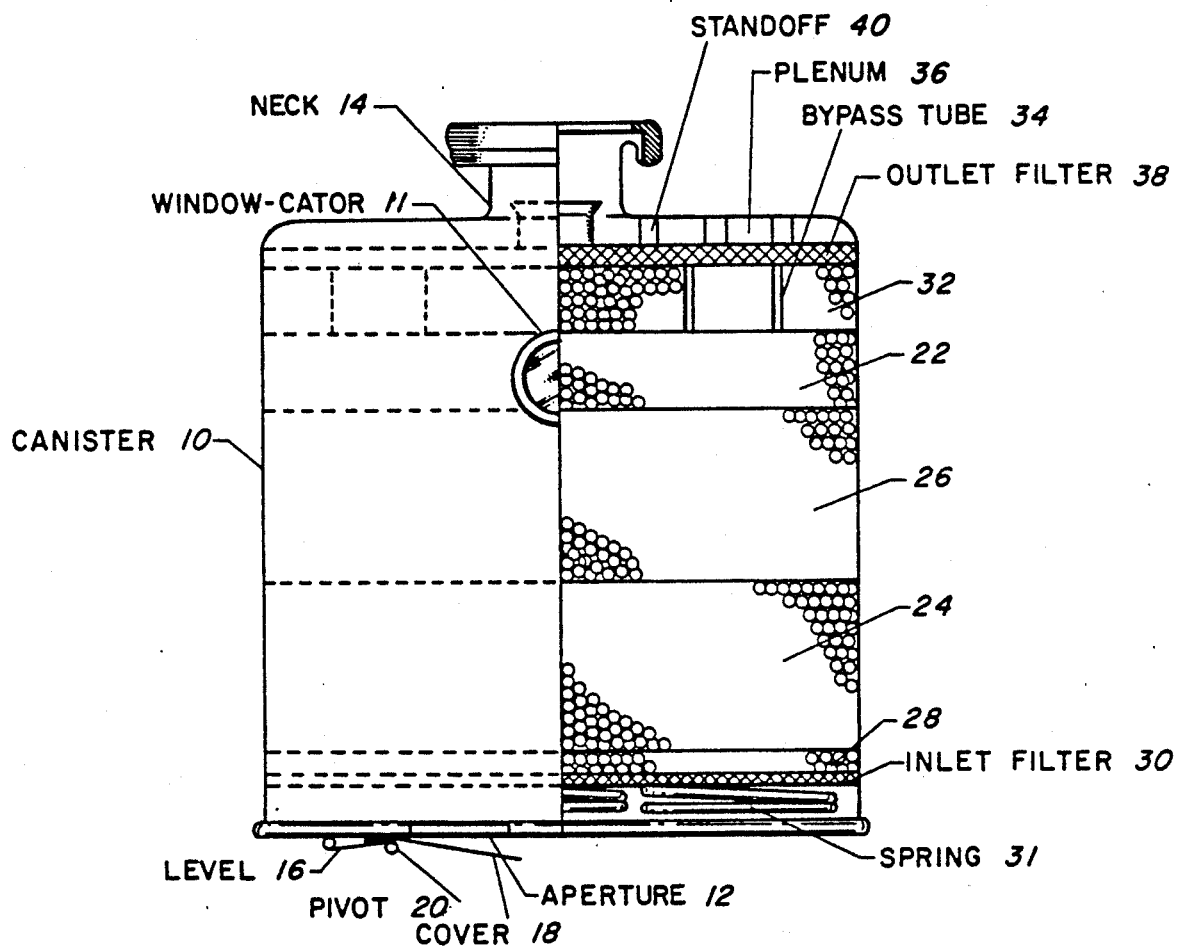
FIGURE

CARBON MONOXIDE CONVERSION DEVICE

BACKGROUND OF THE INVENTION

The invention relates to the field of training devices and simulators, and, more specifically, to training in the use and wearing of a supplemental air supply apparatus that involves a face mask and an oxygen source. In particular, the invention relates to a simulated oxygen-generating canister wherein a filter/carbon-monoxide-converter canister simulates in an open system for training purposes, the oxygen generating chemical canister of the closed system operational breathing apparatus.

Emergency situations are best handled by personnel skilled in competent procedures that have been learned through experience and training. The best insurance is good, thorough preparation.

Many emergencies require that the responding personnel be provided breathing apparatus to cope with toxic environments. Fires, chemical leaks, explosive atmospheres and underground operations are obvious critical environments where breathing assistance is needed. In such cases the operator must have confidence in the apparatus and his own ability to operate it safely and effectively. Otherwise, his attention to the task at hand will suffer in the emergency.

For perfect realism, the oxygen breathing apparatus (OBA) itself would be used in training. But, inasmuch as OBA's use oxygen tanks and oxygen generating devices, cost becomes a significant factor when operational apparatus is employed for training.

Therefore, simulation is encouraged. The next best thing to the perfect realism of the apparatus itself is the apparatus, slightly modified for training. That is what the present invention provides, with an insignificant loss of realism.

Oxygen breathing apparatuses (OBA's) for the most part are one-way, closed loop systems which are not vented except by an exhaust valve. The oxygen canister or oxygen generator is removably inserted into a fitting on the OBA that channels the oxygen into inflatable bags from which the user can breath the oxygen on demand. The user's exhaled breath either is vented to the outside, or a portion of it is returned to the system for mixing with the oxygen supply. Outside air is excluded from the system, which is a practice that protects the user from breathing the toxic atmosphere if one is present. An example is the carbon monoxide filled environment that is created during a fire.

For training and other cases in which there is confidence that the only toxic fumes present in the environment are carbon monoxide with or without carbon dioxide, hydrocarbons, and nitrogen oxides, the present invention is appropriate in lieu of typical operational systems. The invention contemplates the modification or replication of the oxygen generating canister of the operational OBA, converting it into a flow-through system of filtering layers and chemically converting, absorbing and reacting layers. Together the layers are affective to convert carbon monoxide to carbon dioxide and react with the carbon dioxide to form calcium carbonate. Alteration also is made to the breathing bags such that the supply of breathable air is communicated by tubular conduit from the simulated generator to the user, and the user's exhaled breath is directed into the bags to provide the inflation the bags need for realism in feel and appearance.

The prior art includes U.S. Pat. No. 1,808,177 to Putter that discloses an air purifying appliance wherein pendulum breathing and valve-controlled breathing are combined. The pendulum filter may be of activated carbon, silica gel, or soda and lime. U.S. Pat. No. 4,297,117 to Holter et al discloses a fireproof respiratory face mask that has a granular expanded calcium aluminum silicate base coated with layers of soda lime, activated carbon dust, copper dust soaked in a caustic soda solution and manganese dioxide dust held between two layers of ceramic fiber fleece-like material felted together to hold the coated granules. U.S. Pat. No. 4,315,837 to Rourke et al discloses the use of the mixture of metallic oxides available as HOPCALITE from Mine Safety Appliances Company to its advantage as a catalyst for the decomposition of ozone, but to do so by finely dividing its particles and adhering them to a support matrix for maximum effectiveness. U.S. Pat. No. 4,614,186 to John discloses an emergency breathing survival device having a clear plastic hood for the wearer that supports a canister that is mounted on a mouthpiece and contains a carbon dioxide and water vapor absorbing material, usually consisting of silica gel pellets for removing water vapor and lithium hydroxide pellets for removing carbon dioxide. The mouthpiece directs inhaled air into the mouth, and directs exhaled air through the materials into the hood whereat it is available to the wearer during the emergency as his primary source of air. Some pellets that change color when exposed to moisture are intermingled with the material and are visible through a transparent side wall of the mouthpiece to indicate both before and during use whether the materials have lost their affectiveness.

The prior art in the OBA training field includes the operational equipment itself. It burns an oxygen candle as its source, or uses potassium superoxide to provide the oxygen by reacting with the moisture in the user's exhaled breath and at the same time removing the carbon dioxide from the breath. The user initiates operation of the oxygen-generating canister by pulling on a lanyard that is attached to a cotter pin which holds a spring-loaded striker plate in tension. Removal of the pin allows the plate to strike a shaft that extends into the canister. When struck, the shaft causes the oxygen generator to begin its production of oxygen. A device designed specifically for training is the training canister and system disclosed in U.S. Pat. No. 4,471,774. Starting with an operational OBA the system substitutes a flow-through filter in lieu of the oxygen generating canister, and a cross-over valve in lieu of the fitting into which the operational canister is inserted. The training canister also has an actuator that in appearance and operation is realistic to the trainee, but which is adapted internally to open a valve and allow air to flow through the filter and the cross-over valve to the user. The user's exhaled breath communicates through the other half of the cross-over valve into the bags and is used to inflate them. The bags themselves are not altered from their operational configuration; and, excess pressure is vented from the cross-over valve into the ambient atmosphere. Another prior art training device developed by others converts the tubing that is internal to the bags into a conduit from the canister to the fixture at the facemask. Again exhaled breath is used to inflate the bags. It is with such flow-through systems as the latter two devices that the canister disclosed herein is compatible.

The prior art fails to provide an apparatus for training that is inexpensive and reuseable, and that can be used to faithfully create for the trainee a realistic experience in the use of an oxygen breathing apparatus in a smoke-filled environment that simulates the one the user can expect to encounter during the emergency for which the trainee is being prepared. The invention overcomes the failure of the prior art with an apparatus that also can be used in an encounter with an operational emergency in an environment where the toxic fumes are known to be limited to carbon monoxide, carbon dioxide, hydrocarbons and nitrogen oxides. Accordingly, an object of the present invention is to provide a canister and oxygen breathing apparatus simulator to filter, convert, absorb and react with the contaminants that are in the ambient atmosphere of the training or operational environment, such that the ambient atmosphere can be safely inhaled and used as the source of oxygen by the user of the canister and simulator. Such an environment or atmosphere is present in the Navy's Device 19F1 Fire Fighting Training whereat propane burners and smoke generators are employed to simulate emergency scenarios involving fire.

SUMMARY OF THE INVENTION

The present invention is an apparatus comprising layers of filter and chemical parts through which air containing carbon monoxide with or without carbon dioxide, hydrocarbons and nitrogen oxides passes and is scrubbed for inhalation by a user. The apparatus further comprises an adaptation to, or replication of, the canister of an operational oxygen breathing apparatus, wherein the canister now is provided with an actuable aperture to permit the canister to be used as a flow-through device in an adapted or replicated operational breathing apparatus wherein the bag(s) are inflated with the exhaled breath of the user in lieu of air available for inhalation. The chemical parts include layers of activated carbon, activated alumina, a carbon drier, HOPCALITE, and soda lime or lithium hydroxide. Considerations important to the design of an embodiment of the invention include the effectiveness of the apparatus to purify the air, its cost, and the pressure drop across the layers. Excess pressure drop would cause the user to have difficulty breathing, and any significant departure from the pressure levels encountered by a user of an operational OBA would create a training experience that fails in realism.

BRIEF DESCRIPTION OF THE DRAWINGS

The FIGURE is a diagrammatic view partially in cut-away form of an oxygen breathing apparatus (OBA) canister that has been adapted or replicated in accordance with the preferred embodiment to be used as a flow-through device in a training or operational environment that has an atmosphere which includes contaminants as well as oxygen.

DESCRIPTION OF A PREFERRED EMBODIMENT

The embodiment shown in the figure may be used for training in the same manner as an oxygen-generating canister is used for operational exercises with an oxygen breathing apparatus (OBA) such as the Navy's Self-Contained OBA-Type A4. Since the invention acts as a purifier of the air that passes through it to remove carbon monoxide and carbon dioxide as well as particulates and certain other vapors, the embodiment also may be used in an operational role to remove those contaminants in an atmosphere that contains sufficeint oxygen for breathing.

The figure shows canister 10 and its contents. Canister 10 outwardly appears to be the removable canister used with an operational OBA, except upon close inspection window-cator 11 and aperture 12 in the bottom of the canister can be detected. Neither would not be present if the canister were the one used with the operational OBA. Aperture 12 renders the canister a flow-through device permitting outside air to be drawn up and through canister 10, exiting by way of neck 14. Aperture 12 can be thought of in an operational sense as being equivalent to, and a substitute for, the firing pin of the OBA. Retained or replicated in order to simulate the external operation and appearance of the firing mechanism, is spring loaded striker lever 16 and its protective cover, retention cotter pin, and the lanyard connecting the cover to the pin (not shown). In operation, the user of the operational OBA and the user of canister 10 removes the protective cover, and holding it or the lanyard and pulling, withdraws the cotter pin which is holding spring loaded lever 16 in a fixed position under tension. Lever 16 is pivotally mounted to canister 10 such that the removal of the cotter pin releases the spring to rotate lever 16. In the operational OBA canister, lever 16 drives the firing pin upward into a chlorate candle. In canister 10, lever 16 strikes inlet breathing port cover 18 rotating it about its pivot 20 to an open position for aperture 12.

Window-cator 11 permits visual inspection of HOPCALITE 22. HOPCALITE is a product of Mine Safety Appliances Company and comprises a composition of approximately 85% manganese dioxide and 15% copper oxide. It is a catalyst that is useful to convert carbon monoxide to carbon dioxide. Tests have shown that Window-cator 11 changes from blue to pink when moisture is present at a level between 50 ppm and 80 ppm, and denotes that the ability of the HOPCALITE to convert carbon monoxide to carbon dioxide has deteriorated. The color change can be witnessed through window-cator 11 and is a signal to replace canister 10.

In order to prolong the life of the HOPCALITE, it is recommended that moisture absorbing layers be included upstream in the airflow path that begins at aperture 12. The preferred embodiment includes layer 24 of activated alumina sandwiched on one side by layer 26, and on the other by further upstream layer 28 of activated carbon. Each layer has slightly different qualities as a drier either in efficiency or effectiveness. Layer 26 is more efficient as a drier than alumina, and is positioned adjacent to HOPCALITE 22. The carbon drier is like the activated carbon of layer 28, but with a 50% solution of lithium bromide to enhance its affectiveness. Layer 28 of activated carbon removes organic vapors such as propane and other fuel from the air that is drawn into aperture 12. The incoming air first must pass through inlet filter 30 whereat particulate matter is removed. A material of polypropylene, polycarbonate and polypropylene, also known as PELLON available from Pellon Incorporated, is suitable as filter 30. Its efficiency in a one-eight inch thickness to remove 0.3 micron smoke is greater than 80%. Other materials such as FILTRETE or fiberglass mat which are less suitable for the embodiment may be used as an alternate. Inlet filter 30 is held in place by springs 31 which support the layers and prevent any substantial movement of the chemicals. Springs 31 also create a chamber below filter 30 into which the air entering aperture 12 may disperse before being drawn into the filter.

Layer 32 is a sorber to reduce the amount of carbon dioxide. It is adjacent to, and downstream the airflow path from, HOPCALITE layer 22; and, may comprise calcium hydroxide, or soda lime. The chemical reaction causes the carbon dioxide to make calcium carbonate. The configuration shown in the embodiment was designed to specifications that permit 1% carbon dioxide by volume in the air passing to the user. To take advantage of the allowance, and diminish pressure drop through the apparatus, bypass tubes 34 are included. They allow a portion of the airflow to bypass layer 32 and enter plenum 36 without being scrubbed of carbon dioxide.

Layer 32 is capped by outlet filter 38 which removes dust that may have come from the materials contained in canister 10. It may be a fiberglass mat selected from available filter materials for its suitability to perform the intended function. Its selection will depend on its qualification as a particulate filter for the chemicals chosen to be used in the canister. Layer 32 is held in place by a retention screen (not shown) and standoffs 40. The use of standoffs 40 creates plenum 36 above outlet filter 38 and allows air to pass through the filter across its entire surface area. The air passes into the plenum and communicates between or around the standoffs to the exit of the canister at neck 14.

A suitable device may be constructed in an adapted operational canister by using the following arrangement from bottom to top: a chamber for springs 31 having ¾ inch in height, including PELLON filter 30; activated carbon in an amount of 50 grams at a size of 6 to 14 mesh to form layer 28 at a depth of ¼ inch; activated alumina in an amount of 420 grams at a size of ¼ to 8 mesh to form layer 24 at a depth of 2 inches; carbon drier in an amount of 380 grams at a size of 8 to 16 mesh to form layer 26 at a depth of 2 inches; HOPCALITE in an amount of 200 grams at a size of 12 to 20 mesh to form layer 22 at a depth of ¾ inch; and, soda lime in an amount of 150 grams at a size of 6 to 14 mesh to form layer 32 at a depth of ¾ inch.

What is claimed is:

1. A breathing apparatus having a facemask that fits the user to exclude air from entering the nose and mouth of the user except through its means for inhalation, a filtration device coupled to the facemask at its inhalation means for communicating air external to the apparatus through the device and inhalation means into the facemask, and means communicating with the facemask for exhausting the user's exhaled breath into the atmosphere external the apparatus, wherein the filtration device comprises a plurality of chemical compositions that are layered transverse the path which the communicated air follows through the device to the inhalation means, including a first layer comprising manganese dioxide and copper oxide for converting carbon monoxide to carbon dioxide, a second layer downstream thereof comprising calcium hydroxide as a catalyst to carbon dioxide, and a third layer upstream said first layer comprising means for absorbing moisture and removing it from the air before the air reaches said first layer, such that the air is scrubbed of carbon monoxide and carbon dioxide, and is safe to provide its oxygen to the user, wherein said second layer further comprises a conduit through said second layer that permits a portion of said air to bypass the carbon dioxide catalyst and remain untreated thereby.

2. The apparatus of claim 1 wherein said manganese dioxide composes eighty-five percent of said first layer.

3. The apparatus of claim 1 wherein said third layer comprises a carbon composition treated with a fifty percent solution of lithium bromide.

4. The apparatus of claim 3 wherein said carbon composition is a first sublayer, and said third layer further comprises a second sublayer of activated alumina.

5. The apparatus of claim 1 further comprising a fourth layer upstream said third layer comprising activated carbon to remove organic vapors.

6. The apparatus of claim 1 further comprising a fourth layer consisting of six-to-fourteen mesh activated carbon upstream said third layer; and, wherein said third layer has a first sublayer consisting of eight-to-sixteen mesh activated carbon treated with a fifty percent solution of lithium bromide and a second sublayer consisting of one-fourth-to-eight mesh activated alumina, said second layer consists of six-to-fourteen mesh soda lime, and said first layer consists of twelve-to-twenty mesh HOPCALITE.

7. The apparatus of claim 1 wherein said filtration device comprises a canister containing said compositions, and having an inlet aperture for admitting air into the canister and an outlet neck removably attachable to the apparatus for communicating air from the canister to the inhalation means, wherein the canister includes a cover for said inlet aperture and a mechanism operable by the user to remove the cover.

8. The apparatus of claim 7 wherein said compositions are bounded on their transverse perimeter by the wall of said canister, on their extreme downstream side by an outlet filter and on their extreme upstream side by an inlet filter, and wherein said outlet filter is held in spaced relationship from said outlet neck to form a plenum, and said inlet filter is held in spaced relationship from said inlet aperture by bias means for retaining said compositions in their relative positions under predetermined compression.

9. The apparatus of claim 8 wherein said inlet filter consists of PELLON, and said outlet filter consists of fiberglass.

10. The apparatus of claim 8 further comprising a fourth layer consisting of six-to-fourteen mesh activated carbon upstream said third layer; and, wherein said third layer has a first sublayer consisting of eight-to-sixteen mesh activated carbon treated with a fifty percent solution of lithium bromide and a second sublayer consisting of one-fourth-to-eight mesh activated alumina, said second layer consists of six-to-fourteen mesh soda lime, and said first layer consists of twelve-to-twenty mesh HOPCALITE.

11. The apparatus of claim 10 wherein the activated carbon is 4% by relative depth in the axial dimension between said aperture and said neck of the compositions in the canister, the activated alumina and the carbon drier each are 35% by relative depth, and the HOPCALITE and the soda lime each are 13% by relative depth.

* * * * *